G. SANDERS.
Straw-Stacker.
No. 159,458. Patented Feb. 2, 1875.
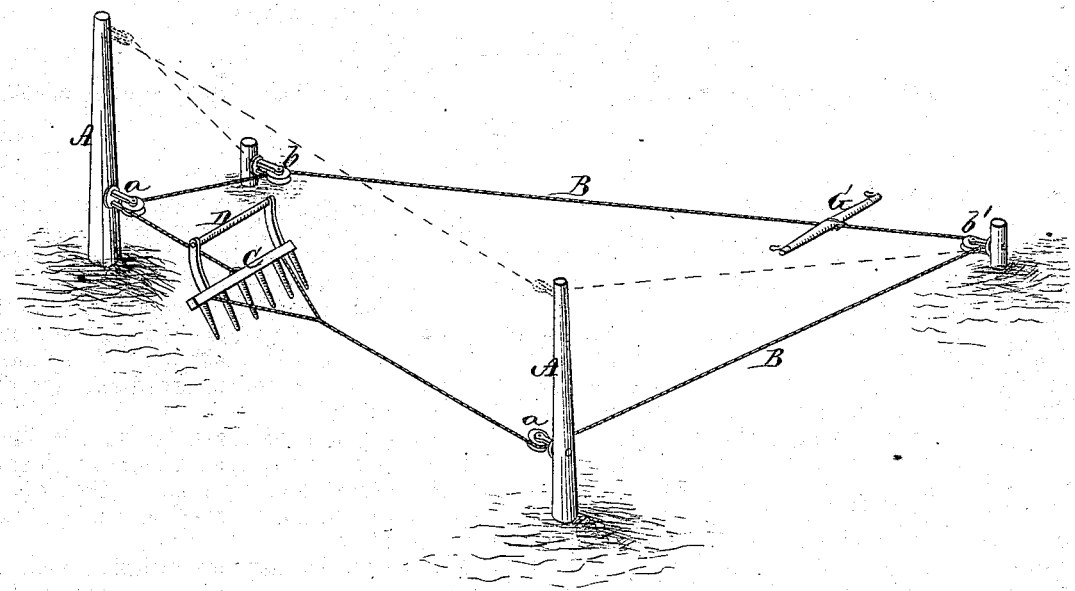
WITNESSES
Henry N. Miller
C. L. Everk.
INVENTOR
Jerome Sanders.
per Alexander Mason
Attorneys

UNITED STATES PATENT OFFICE.

GEROME SANDERS, OF MARTINSVILLE, ILLINOIS.

IMPROVEMENT IN STRAW-STACKERS.

Specification forming part of Letters Patent No. 159,458, dated February 2, 1875; application filed August 28, 1874.

*To all whom it may concern:*

Be it known that I, GEROME SANDERS, of Martinsville, in the county of Clark and in the State of Illinois, have invented certain new and useful Improvements in Straw-Stackers; and do hereby declare that the following is a full, clear, and exact description thereof, reference being had to the accompanying drawings and to the letters of reference marked thereon, making a part of this specification.

My invention is particularly intended for use in thrashing grain to carry off and stack the straw; and the nature of my invention consists in an endless rope passing around suitably-arranged pulleys, and provided with a rake and a single-tree, as will be hereinafter more fully set forth.

In order to enable others skilled in the art to which my invention appertains to make and use the same, I will now proceed to describe its construction and operation, referring to the annexed drawing, which represents a perspective view of my invention.

A A represent two posts to be driven into the ground at suitable distance apart, each provided with a pulley, a, attached to the post by a swivel, and in such a manner that it can be easily changed to any desired height thereon. b b' represent two pulleys, also arranged to turn on swivels, and fastened by stakes close to the ground. Around the four pulleys thus arranged is passed a rope, B, one end of which is attached to the center on the back of a rake, C, and the other end is, by two short pieces of rope, connected to the rake-head on the under side near the ends. The rake C is provided with a handle, D, as shown. To the rope B, between the pulleys b b', is fastened a single-tree, G, for the attachment of the horse. By leading the horse backward and forward the rake will follow.

By setting one of the poles at the back of the stack the straw may be stacked just as high as desired, and by making the rope B long enough the stack may be made of any length required.

This device will dispense with all the hands in taking straw away from the separator but two—one to guide the horse and the other the rake.

Having thus fully described my invention, what I claim as new, and desire to secure by Letters Patent, is—

The combination of the poles A A, with pulleys a a, ground pulleys b b', endless rope B, and rake C, all substantially as and for the purposes herein set forth.

In testimony that I claim the foregoing I have hereunto set my hand this 10th day of August, 1874.

GEROME SANDERS.

Witnesses:
L. D. McCLURE,
DAVID McCLURE.